(12) United States Patent
Nguyen et al.

(10) Patent No.: US 11,785,424 B1
(45) Date of Patent: Oct. 10, 2023

(54) SYSTEM AND METHOD FOR ASSET TRACKING FOR WASTE AND RECYCLING CONTAINERS

(71) Applicant: WM Intellectual Property Holdings, L.L.C., Houston, TX (US)

(72) Inventors: Vu Nguyen, Houston, TX (US); Brian Hertz, Houston, TX (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 17/851,796

(22) Filed: Jun. 28, 2022

Related U.S. Application Data

(60) Provisional application No. 63/215,572, filed on Jun. 28, 2021.

(51) Int. Cl.
*H04W 24/00* (2009.01)
*H04W 4/029* (2018.01)
*H04M 1/02* (2006.01)

(52) U.S. Cl.
CPC .......... *H04W 4/029* (2018.02); *H04M 1/026* (2013.01); *H04M 2250/10* (2013.01); *H04M 2250/12* (2013.01)

(58) Field of Classification Search
CPC .............................. H04W 4/029; H04M 1/026
See application file for complete search history.

(56) References Cited

U.S. PATENT DOCUMENTS

| | | | |
|---|---|---|---|
| 6,484,035 B2 | 11/2002 | Allen, Jr. | |
| 6,510,380 B1 | 1/2003 | Curatolo et al. | |
| 6,560,536 B1 | 5/2003 | Sullivan et al. | |
| 6,606,556 B2 | 8/2003 | Curatolo et al. | |
| 6,753,775 B2 | 6/2004 | Auerbach et al. | |
| 6,889,135 B2 | 5/2005 | Curatolo et al. | |
| 7,072,668 B2 | 7/2006 | Chou | |
| 7,187,278 B2 | 3/2007 | Biffar | |
| 7,321,774 B1 | 1/2008 | Lau et al. | |
| 7,339,469 B2 | 3/2008 | Braun | |
| 7,375,619 B2 | 5/2008 | Auerbach et al. | |
| 7,529,561 B2 | 5/2009 | Heinonen et al. | |
| 7,714,778 B2 | 5/2010 | Dupray | |
| 7,848,905 B2 | 12/2010 | Troxler et al. | |
| RE42,435 E | 6/2011 | Katz | |
| 7,978,065 B2 | 7/2011 | Schnitz et al. | |
| 7,978,067 B2 | 7/2011 | Wagner et al. | |
| 8,009,034 B2 | 8/2011 | Dobson et al. | |

(Continued)

FOREIGN PATENT DOCUMENTS

| | | | | |
|---|---|---|---|---|
| CA | 2819534 A1 | * | 12/2013 | ............. G01S 19/16 |
| JP | H09147963 A | * | 6/1997 | |

(Continued)

*Primary Examiner* — Erika A Washington
(74) *Attorney, Agent, or Firm* — Greenberg Traurig LLP

(57) ABSTRACT

Systems and methods are provided for asset tracking for waste and recycling containers. A low-cost GPS location asset tracker can be provided for tracking the whereabouts of waste and recycling containers. The asset tracker can include a housing attachable to the waste container, a primary control board, an accelerometer, a battery pack, and a tracking system consisting of a GPS receiver, a GPS antenna, a cellular transceiver, and a cellular antenna traced directly onto the primary control board.

4 Claims, 12 Drawing Sheets

(56) References Cited

U.S. PATENT DOCUMENTS

| | | |
|---|---|---|
| 8,058,985 B2 | 11/2011 | Dobson et al. |
| 8,135,413 B2 | 3/2012 | Dupray |
| 8,154,421 B2 | 4/2012 | Saltzman et al. |
| 8,203,451 B2 | 6/2012 | Evans et al. |
| 8,223,009 B2 | 7/2012 | Anderson et al. |
| 8,255,149 B2 | 8/2012 | Brosius et al. |
| 8,258,942 B1 | 9/2012 | Lanzone et al. |
| 8,319,643 B2 | 11/2012 | Evans et al. |
| 8,321,124 B2 | 11/2012 | Curatolo et al. |
| 8,330,059 B2 | 12/2012 | Curotto |
| 8,428,913 B2 | 4/2013 | Troxler |
| 8,461,958 B2 | 6/2013 | Saenz et al. |
| 8,489,113 B2 | 7/2013 | Walter et al. |
| 8,611,920 B2 | 12/2013 | Lau et al. |
| 8,620,343 B1 | 12/2013 | Lau et al. |
| 8,626,568 B2 | 1/2014 | Warkentin et al. |
| 8,674,243 B2 | 3/2014 | Curotto |
| 8,773,262 B2 | 7/2014 | Bae et al. |
| 8,779,933 B2 | 7/2014 | Hartmann et al. |
| 8,830,124 B1 | 9/2014 | Akbari et al. |
| 8,862,378 B2 | 10/2014 | Curatolo et al. |
| 8,890,683 B2 | 11/2014 | Schnitz et al. |
| 8,978,467 B2 | 3/2015 | Wagner et al. |
| 9,013,306 B2 | 4/2015 | Koh et al. |
| 9,020,527 B2 | 4/2015 | Lee et al. |
| 9,253,752 B2 | 2/2016 | Lee et al. |
| 9,347,818 B2 | 5/2016 | Curotto |
| 9,355,381 B2 | 5/2016 | Chakraborty et al. |
| 9,368,007 B2 | 6/2016 | Vogt |
| 9,402,160 B2 | 7/2016 | Lee et al. |
| 9,424,722 B2 | 8/2016 | Adrezin et al. |
| 9,472,125 B2 | 10/2016 | Debrody et al. |
| 9,525,193 B2 | 12/2016 | Lee et al. |
| 9,607,281 B2 | 3/2017 | Lee et al. |
| 9,618,496 B2 | 4/2017 | Troxler |
| 9,648,456 B2 | 5/2017 | Jordan et al. |
| 9,720,480 B2 | 8/2017 | Gregory et al. |
| 9,774,410 B2 | 9/2017 | Daoura et al. |
| 9,786,146 B2 | 10/2017 | Markwell et al. |
| 9,794,942 B1 * | 10/2017 | Arrakoski ......... H04W 72/0473 |
| 9,813,850 B2 | 11/2017 | Lee et al. |
| 9,841,506 B2 | 12/2017 | Brosius et al. |
| 9,875,626 B2 | 1/2018 | Vogt |
| 9,913,087 B2 | 3/2018 | Jordan et al. |
| 9,915,559 B2 | 3/2018 | Radcliff |
| 9,989,649 B2 | 6/2018 | Buck, Jr. et al. |
| 10,140,830 B2 | 11/2018 | Markwell et al. |
| 10,152,737 B2 | 12/2018 | Lyman |
| 10,222,853 B2 | 3/2019 | Suh et al. |
| 10,320,081 B2 | 6/2019 | Man |
| 10,395,076 B2 | 8/2019 | Phillips et al. |
| 10,420,325 B2 | 9/2019 | Czarnecky et al. |
| 10,497,289 B2 | 12/2019 | Debrody et al. |
| 10,524,083 B2 | 12/2019 | Krzych et al. |
| 10,602,244 B2 | 3/2020 | Struhsaker et al. |
| 10,621,551 B2 | 4/2020 | Nishimura et al. |
| 10,643,441 B1 | 5/2020 | Sanchez |
| 10,684,350 B2 | 6/2020 | Dupray et al. |
| 10,728,873 B2 | 7/2020 | Runyon |
| 10,771,926 B1 | 9/2020 | Carr |
| 10,783,419 B2 | 9/2020 | Singh |
| 10,824,771 B2 | 11/2020 | Achillopoulos |
| 10,852,289 B2 | 12/2020 | Troxler |
| 10,852,809 B2 | 12/2020 | Suh et al. |
| 10,877,013 B2 | 12/2020 | Mandava et al. |
| 10,891,582 B2 | 1/2021 | Klingbeil et al. |
| 10,937,292 B2 | 3/2021 | Swayne et al. |
| 10,948,476 B2 | 3/2021 | Troxler |
| 10,969,499 B2 | 4/2021 | Naim |
| 11,074,799 B1 | 7/2021 | Painter et al. |
| 11,129,237 B1 | 9/2021 | Neber |
| 11,184,858 B2 | 11/2021 | Daoura et al. |
| 11,195,184 B1 | 12/2021 | Dixon et al. |
| 11,209,553 B2 | 12/2021 | Linton et al. |
| 11,232,390 B1 | 1/2022 | Leung et al. |
| 11,257,024 B2 | 2/2022 | Barton et al. |
| 11,273,005 B2 | 3/2022 | Beck et al. |
| 11,277,712 B2 | 3/2022 | Guydouk |
| 11,308,441 B2 | 4/2022 | Lau et al. |
| 11,330,419 B2 | 5/2022 | Thomas |
| 11,354,989 B1 | 6/2022 | Sanchez |
| 11,367,322 B2 | 6/2022 | Igein |
| 11,373,506 B1 | 6/2022 | Buena, II |
| 2003/0149526 A1 | 8/2003 | Zhou et al. |
| 2004/0192352 A1 | 9/2004 | Vallstrom et al. |
| 2004/0198386 A1 | 10/2004 | Dupray |
| 2004/0266457 A1 | 12/2004 | Dupray |
| 2007/0171048 A1 | 7/2007 | Shapiro |
| 2008/0007398 A1 | 1/2008 | Derose et al. |
| 2008/0129490 A1 | 6/2008 | Linville et al. |
| 2008/0165056 A1 | 7/2008 | Bader |
| 2008/0186163 A1 | 8/2008 | Mills |
| 2008/0309487 A1 | 12/2008 | Chao |
| 2009/0016308 A1 | 1/2009 | Twitchell, Jr. |
| 2009/0061897 A1 | 3/2009 | Hamilton et al. |
| 2009/0072975 A1 | 3/2009 | Arguin |
| 2009/0082040 A1 | 3/2009 | Kahn |
| 2009/0102659 A1 | 4/2009 | Evans et al. |
| 2009/0153401 A1 * | 6/2009 | Eitan ................. G01S 19/34 |
| | | 342/450 |
| 2009/0299520 A1 | 12/2009 | Binding et al. |
| 2010/0097208 A1 | 4/2010 | Rosing et al. |
| 2010/0179897 A1 | 7/2010 | Gafford et al. |
| 2011/0156910 A1 | 6/2011 | Pieper et al. |
| 2012/0092215 A1 | 4/2012 | Kwong |
| 2012/0201277 A1 | 8/2012 | Tanner et al. |
| 2012/0206296 A1 | 8/2012 | Wan |
| 2012/0252488 A1 | 10/2012 | Hartmann et al. |
| 2012/0252501 A1 | 10/2012 | Smith et al. |
| 2013/0012234 A1 | 1/2013 | Tufty et al. |
| 2013/0066757 A1 | 3/2013 | Lovelace et al. |
| 2013/0150028 A1 * | 6/2013 | Akins ................. H04L 67/55 |
| | | 455/456.3 |
| 2013/0342394 A1 | 12/2013 | Leslie et al. |
| 2013/0344885 A1 | 12/2013 | Parisi et al. |
| 2014/0091138 A1 * | 4/2014 | Nordin ............... H01Q 1/2216 |
| | | 235/375 |
| 2015/0119069 A1 | 4/2015 | Harris et al. |
| 2015/0119070 A1 | 4/2015 | Harris et al. |
| 2015/0223019 A1 | 8/2015 | East |
| 2016/0187188 A1 | 6/2016 | Curotto |
| 2016/0328677 A1 | 11/2016 | Ferrer et al. |
| 2016/0338000 A1 | 11/2016 | Halla et al. |
| 2016/0381499 A1 | 12/2016 | Draghici et al. |
| 2017/0019755 A1 | 1/2017 | Thacher et al. |
| 2017/0108261 A1 | 4/2017 | Broussard |
| 2017/0344939 A1 | 11/2017 | Linton et al. |
| 2018/0079591 A1 | 3/2018 | Doty et al. |
| 2018/0342139 A1 | 11/2018 | Otavio |
| 2019/0122511 A1 | 4/2019 | Hicks |
| 2019/0303633 A1 | 10/2019 | Pleshek et al. |
| 2019/0317223 A1 | 10/2019 | Czarnecky et al. |
| 2019/0355197 A1 | 11/2019 | Mirpuri |
| 2019/0392385 A1 | 12/2019 | Holatz |
| 2020/0032556 A1 | 1/2020 | Nguyen et al. |
| 2020/0065751 A1 | 2/2020 | Waters et al. |
| 2020/0074397 A1 | 3/2020 | Burda et al. |
| 2020/0104791 A1 | 4/2020 | Takrouri et al. |
| 2020/0105167 A1 | 4/2020 | Debrody et al. |
| 2020/0200918 A1 | 6/2020 | Wascow et al. |
| 2020/0234548 A1 | 7/2020 | Hicks |
| 2020/0241103 A1 | 7/2020 | Vernon et al. |
| 2020/0307614 A1 | 10/2020 | Jordan et al. |
| 2020/0325703 A1 | 10/2020 | Strang |
| 2020/0333426 A1 | 10/2020 | Dupray et al. |
| 2020/0341107 A1 | 10/2020 | Czarnecky et al. |
| 2020/0379079 A1 | 12/2020 | Dupray et al. |
| 2020/0387861 A1 | 12/2020 | Sanglier et al. |
| 2021/0047110 A1 | 2/2021 | Gavin et al. |
| 2021/0049436 A1 | 2/2021 | Nalbant |
| 2021/0081516 A1 | 3/2021 | Storey et al. |
| 2021/0084473 A1 * | 3/2021 | Ossin .................. H04W 4/80 |
| 2021/0089687 A1 | 3/2021 | Achillopoulos |
| 2021/0116578 A1 | 4/2021 | Krzych et al. |

(56) References Cited

U.S. PATENT DOCUMENTS

| | | | |
|---|---|---|---|
| 2021/0152976 A1 | 5/2021 | Daoura et al. |
| 2021/0165979 A1 | 6/2021 | Wilkinson et al. |
| 2021/0256833 A1 | 8/2021 | Daoura et al. |
| 2021/0327243 A1 | 10/2021 | Franco et al. |
| 2021/0345062 A1 | 11/2021 | Koga et al. |
| 2021/0350318 A1 | 11/2021 | Williamson et al. |
| 2022/0107057 A1 | 4/2022 | Lysenkov |
| 2022/0146059 A1 | 5/2022 | Selevan et al. |
| 2022/0172163 A1 | 6/2022 | Barton et al. |
| 2022/0180309 A1 | 6/2022 | Burtner et al. |
| 2022/0201427 A1 | 6/2022 | Rechenberger |

FOREIGN PATENT DOCUMENTS

| | | | | |
|---|---|---|---|---|
| JP | 2012028921 A | * | 2/2012 | |
| WO | WO-2018203205 A1 | * | 11/2018 | ............. G01B 21/32 |

* cited by examiner

SYSTEM AND METHOD FOR ASSET TRACKING FOR WASTE AND RECYCLING CONTAINERS

1. RELATED APPLICATIONS

This application claims the benefit, and priority benefit, of U.S. Provisional Patent Application Ser. No. 63/215,572, filed Jun. 28, 2021, the disclosure and contents of which are incorporated by reference herein in their entirety

2. FIELD OF THE INVENTION

The presently disclosed subject matter relates to asset tracking for waste and recycling containers.

3. DESCRIPTION OF THE RELATED ART

Roll-off containers, front-end-load containers and inter-modal containers can be utilized in connection with waste and recycling pick-up services for customers. Some of these containers are frequently prone to being moved to a different parts of a customer location, causing collections drivers to lose track of the containers within a facility.

Additionally, in some areas, intermodal containers are frequently passed between multiple transportation partners and visibility to their location is lost as they are transferred between different modes of transport.

Additionally, out of service containers can be located at container shops waiting to be deployed to future customer locations. Sales and operations teams often do not have great insight into what container assets are available and look to purchase new equipment instead of using what is already available at existing container shops and similar locations.

Improvements in this field of technology are desired

SUMMARY

Various illustrative embodiments of systems and methods for asset tracking for waste and recycling containers are disclosed herein. In certain aspects, the system can include an asset tracking device for tracking the location of a waste container. The asset tracking device can include: a housing attachable to the waste container; a primary control board; an accelerometer; a battery pack; and a tracking system consisting of: a GPS receiver, a GPS antenna, a cellular transceiver, and a cellular antenna traced directly onto the primary control board. The primary control board, the accelerometer, the battery pack and the tracking system can be housed within the housing.

BRIEF DESCRIPTION OF THE DRAWINGS

A better understanding of the presently disclosed subject matter can be obtained when the following detailed description is considered in conjunction with the drawings and figures herein, wherein.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to asset tracking for waste and recycling containers. In certain illustrative embodiments, a low-cost GPS location asset tracker can be provided for tracking the whereabouts of waste and recycling containers.

Figure 1A:
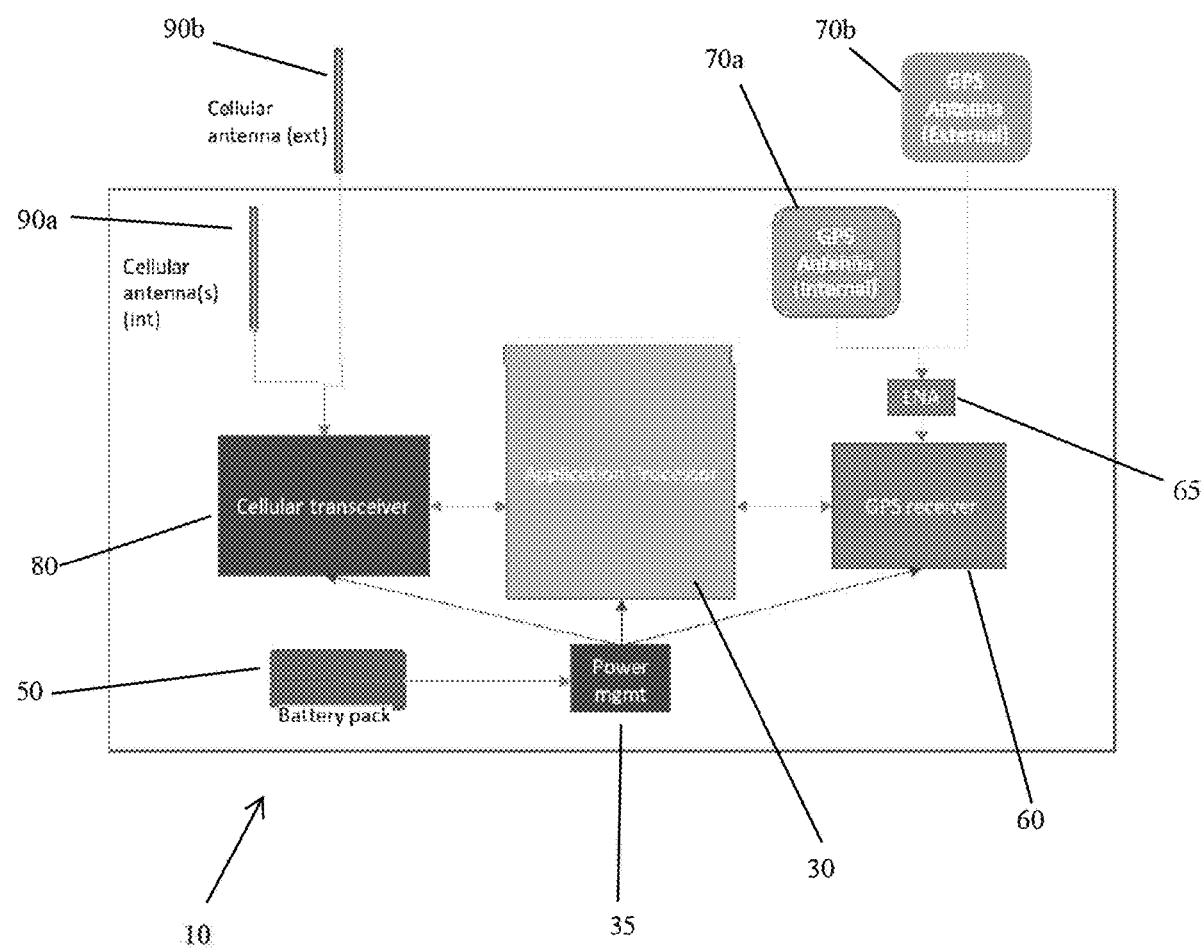
FIG. 1A and FIG. 1B are schematic overviews of an asset tracker in accordance with illustrative embodiments of the presently disclosed subject matter.
Figure 1B:
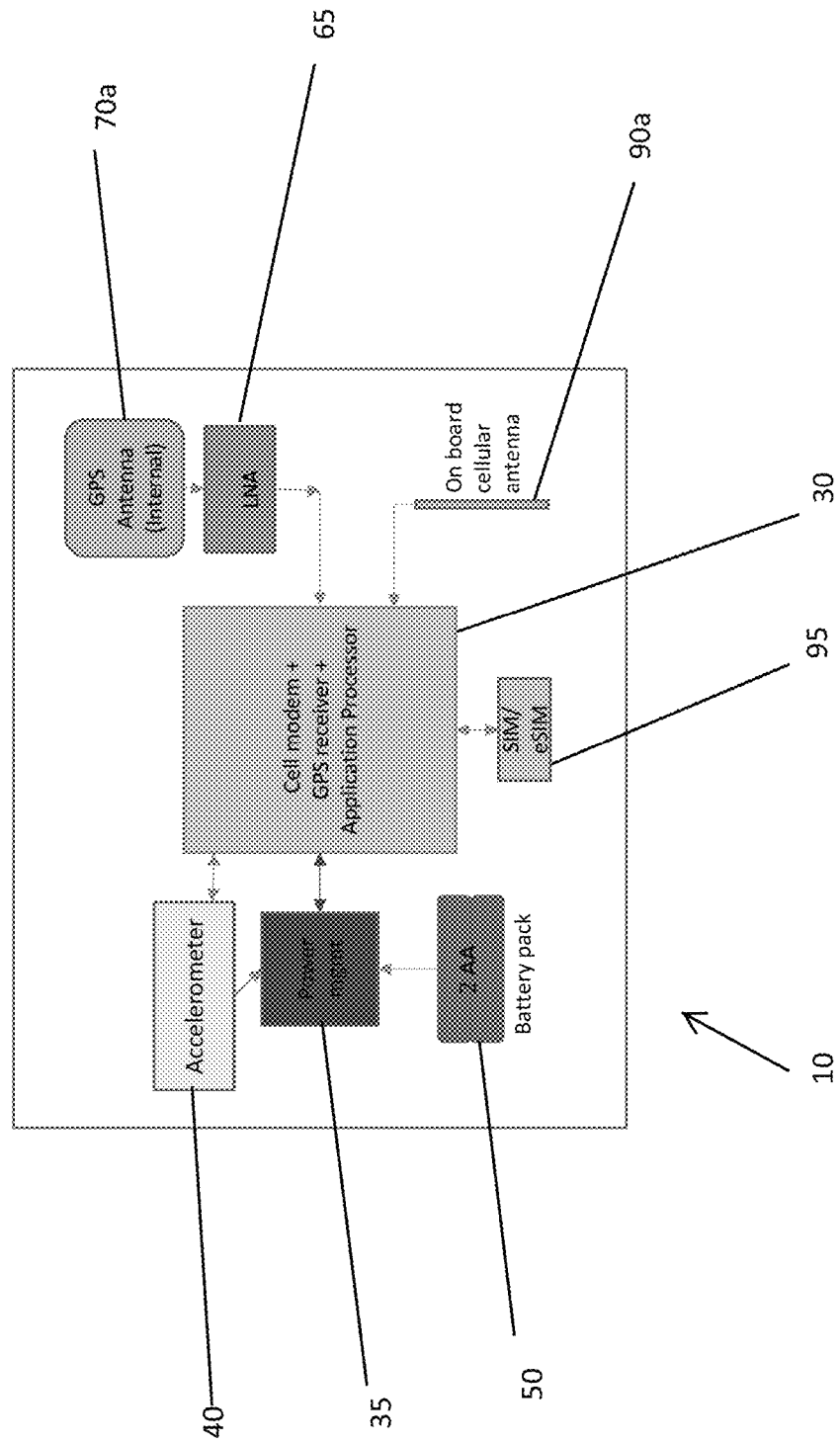

Schematics of illustrative embodiments of an asset tracker 10 are shown in FIG. 1A and FIG. 1B. Asset tracker 10 can include various combinations of: a housing 20 attachable to the waste container; a primary control board comprising an application processor 30; a power management system 35; an accelerometer 40; a battery pack 50; and a tracking system consisting of: a GPS receiver 60, a low noise amp (LNA) 65; an internal GPS antenna 70a and/or external GPS antenna 70b, a cellular transceiver 80, a cellular antenna 90a traced directly onto the primary control board; and a SIM/eSIM 95. In certain illustrative embodiments, the various components of asset tracker 10 can be housed inside of housing 20. A cellular antenna 90a external to the housing can also be utilized.

Most current products in this space are "fully loaded," containing a number of technologies designed to establish the location of containers including GPS, cellular, LORAWAN, wifi, etc. By comparison, in certain illustrative embodiments, the presently disclosed asset tracker 10 will seek to use only the minimum number of technologies—e.g., GPS and cellular—in order to produce the desired functioning device at reduced cost.

In certain illustrative embodiments, the asset tracker 10 can include a chipset on primary control board 30 such as (but not limited to) a Nordic Cellular and GPS chipset (nRF9160), configured to minimize the size and cost of the enclosure. The asset tracker 10 can also utilize 2 (two) AA batteries in battery pack 50 that are estimated to provide up to 5 years of battery life. The asset tracker 10 can be equipped with an accelerometer 40, in order to maximize battery life and minimize GPS locking durations. The accelerometer 40 can act as a mechanism to trigger a report of a motion event. The asset tracker 10 can be equipped with a timer to enable a wake from low power mode and to prompt the asset tracker 10 to look for new GPS coordinates or repeat/reuse the existing coordinates if the asset tracker 10 (and therefore, the container) has not moved within a set number of recording intervals. This functionality can save battery life by not waiting for the GPS lock to occur and keeping the device on longer than needed.

Figure 2:
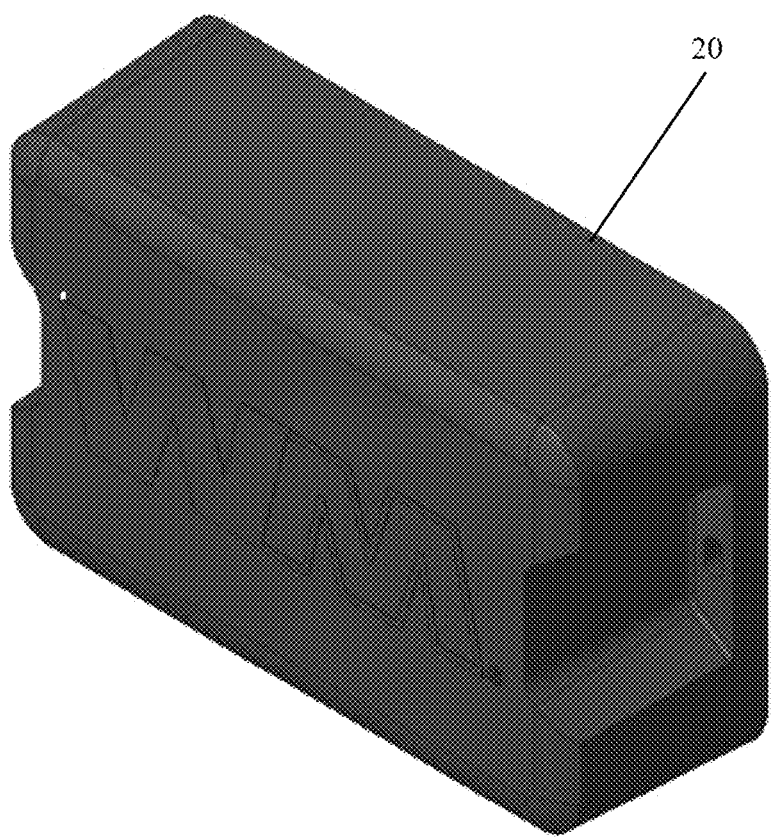
FIG. 2 is a housing for an asset tracker in accordance with an illustrative embodiment of the presently disclosed subject matter.

In certain illustrative embodiments, the asset tracker 10 can include a large housing 20 for housing the components thereof, as shown in FIG. 2. The housing 20 can be attached directly to the waste container, in order to maintain a weatherproof design. The electronics for the asset tracker 10 can be placed on a control board located vertically in parallel to the mounting surface.

Figure 3:
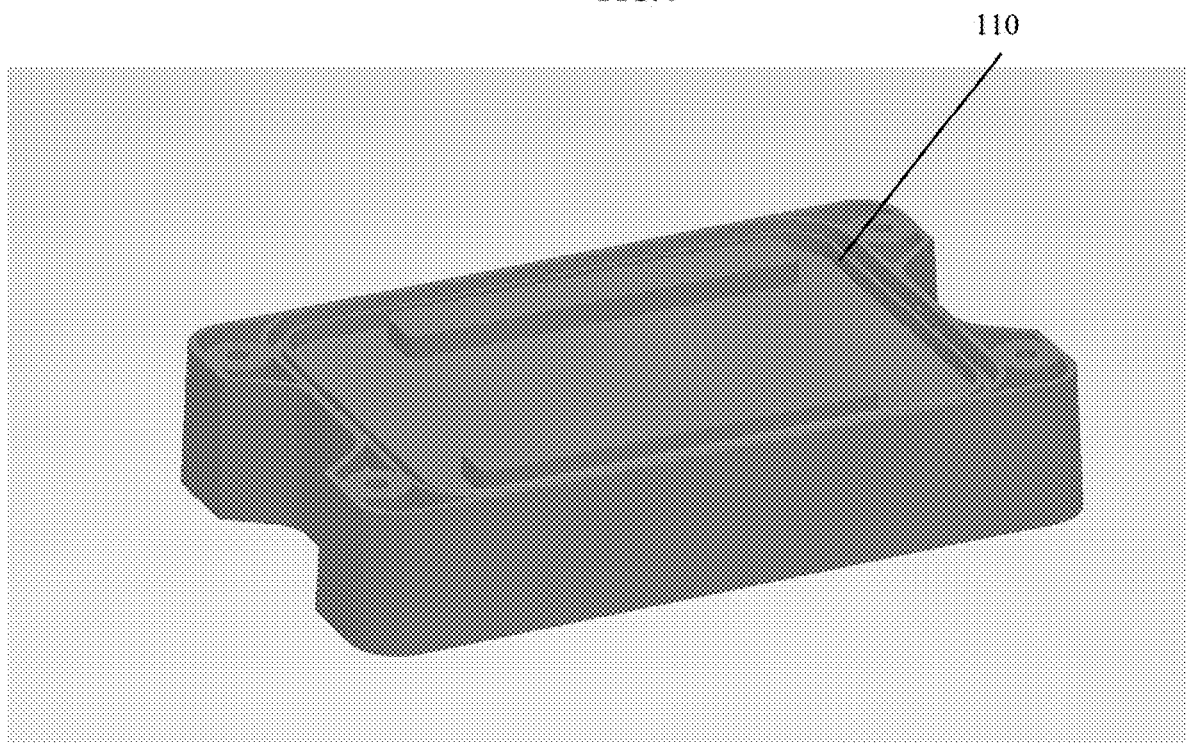
FIG. 3 is a plate for the housing of an asset tracker in accordance with an illustrative embodiment of the presently disclosed subject matter.

In certain illustrative embodiments, the asset tracker 10 can be enclosed via a plate 110 running along the backside of the housing 100 and sliding into established holes in each corner, as shown in FIG. 3, that can be sealed via O-ring.

Figure 4:
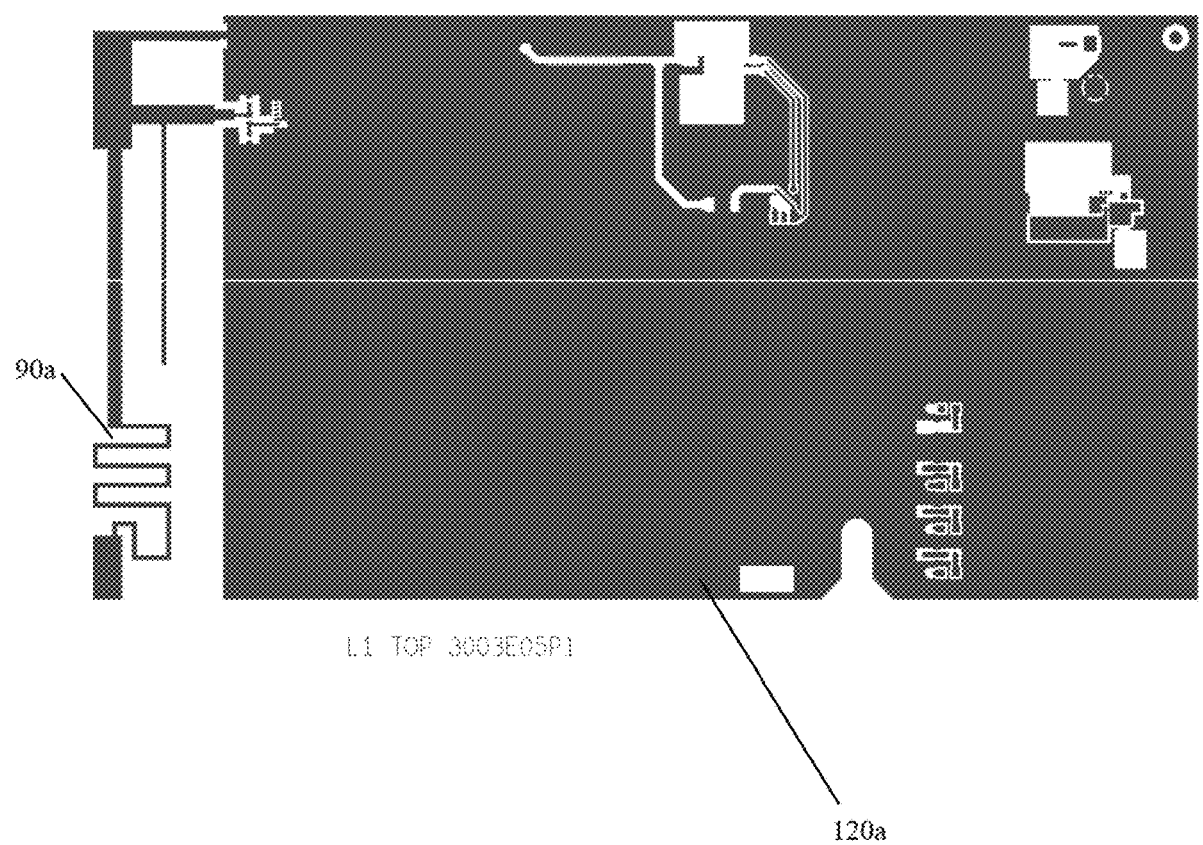
FIG. 4 is a primary control board (PCB) for an asset tracker in accordance with an illustrative embodiment of the presently disclosed subject matter.
Figure 5:
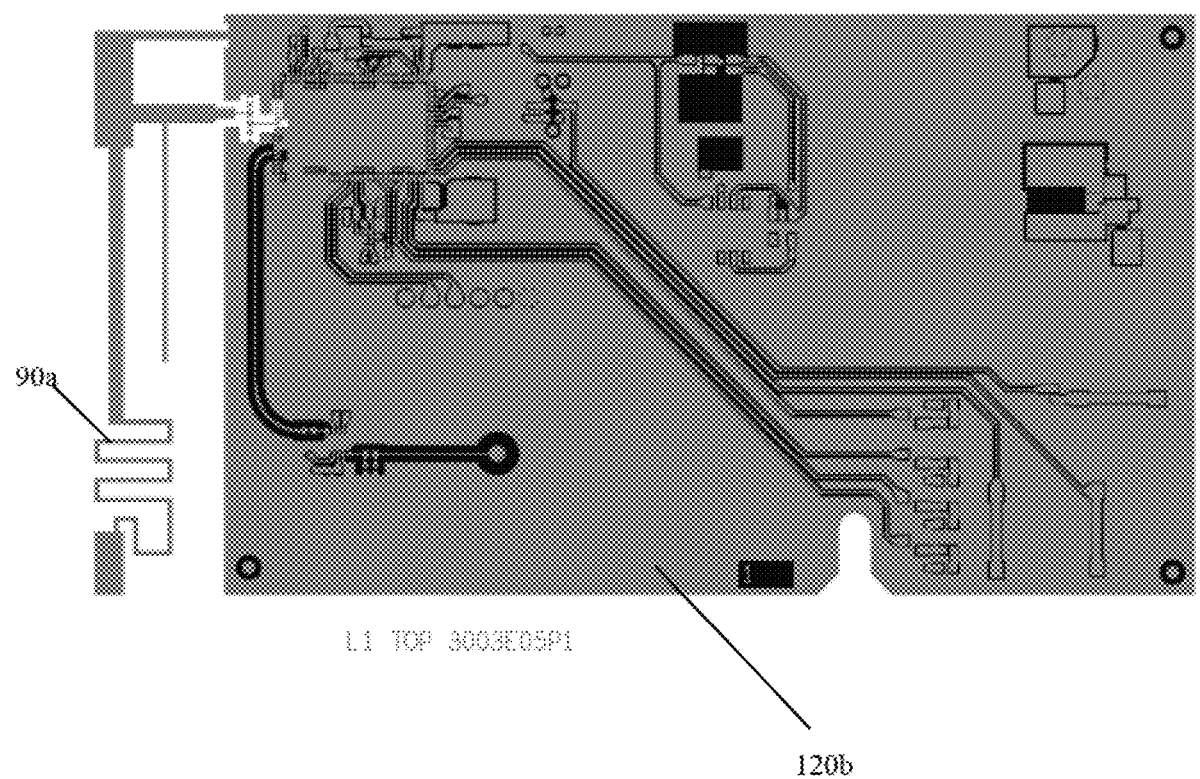
FIG. 5 is a primary control board (PCB) for an asset tracker in accordance with an illustrative embodiment of the presently disclosed subject matter.
Figure 6:
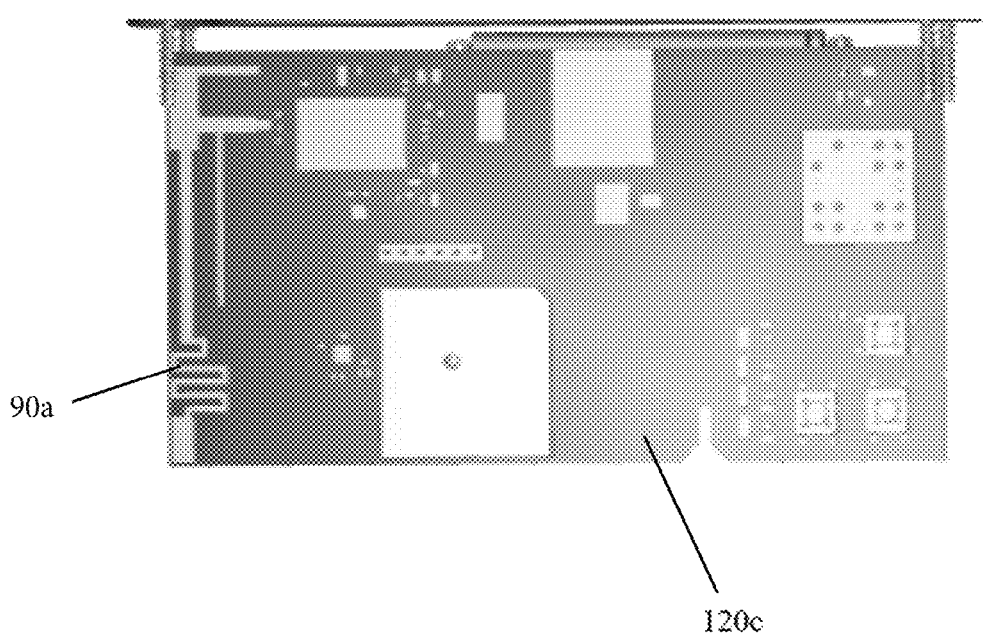
FIG. 6 is a primary control board (PCB) for an asset tracker in accordance with an illustrative embodiment of the presently disclosed subject matter.

Various illustrative embodiments of the primary control board (PCB) 120 for the asset tracker 10 are shown in FIGS. 4-6. Primary control board (PCB) 120a is shown in FIG. 4, primary control board (PCB) 120b is shown in FIG. 5, and primary control board (PCB) 120c is shown in FIG. 6. In certain illustrative embodiments, the asset tracker 10 can include an antenna 90a for the cellular radio. The antenna 90 can be traced directly onto the primary control board (PCB) 120 in lieu of a cellular antenna chip (see the left side of the images in FIGS. 4-6). This will result in lower manufacturing costs due to less manufacturing time and the added cost of an externally-located antenna.

In certain illustrative embodiments, the asset tracker 10 can utilize strictly location-based asset management using only GPS and cellular. Many existing designs are focused on the automation of waste management processes, such as unlocking the container, fill sensors, etc., rather than asset management as described herein.

Figure 7:
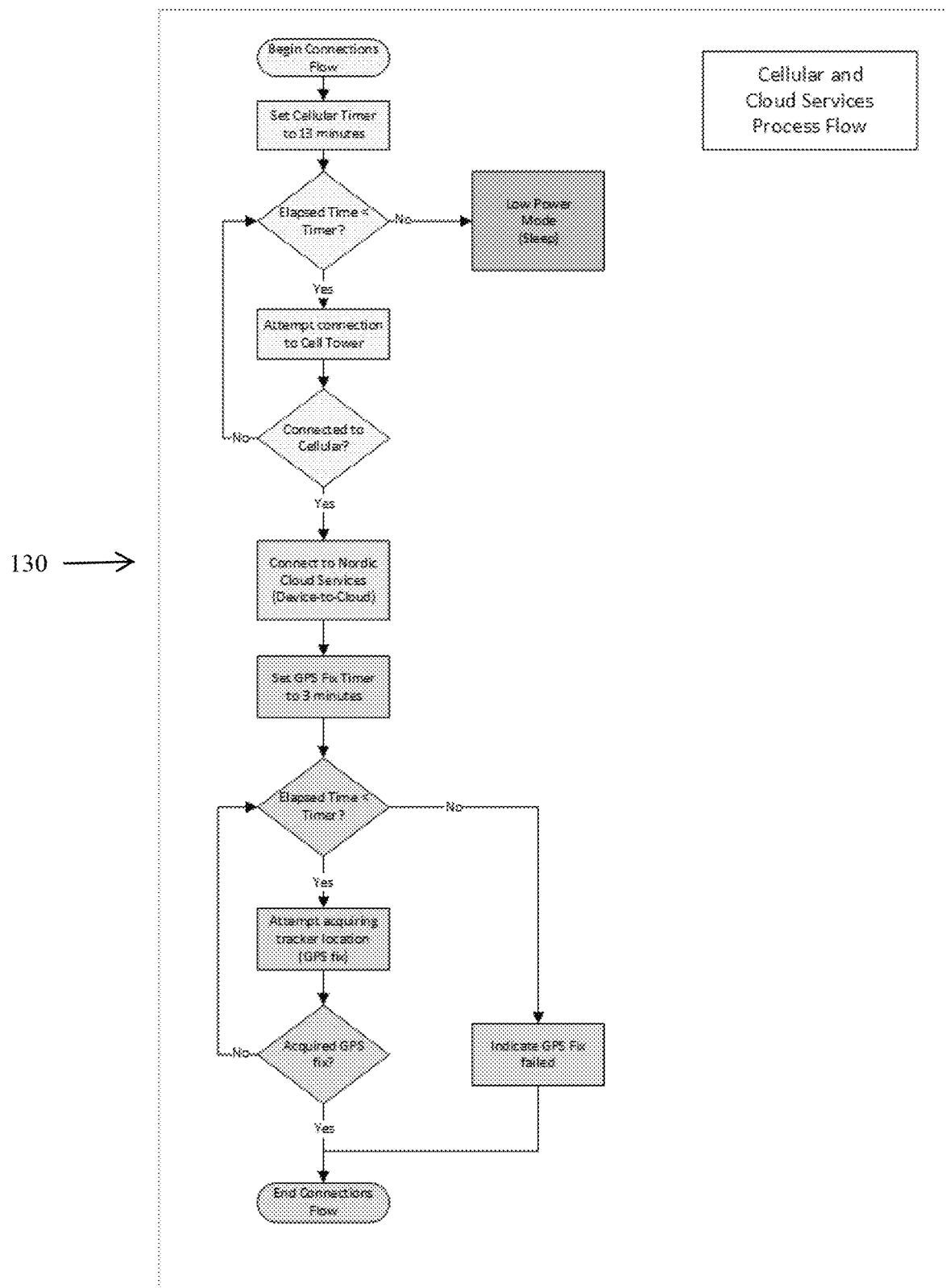
FIG. 7 is a process flow for cellular and cloud services for an asset tracker in accordance with an illustrative embodiment of the presently disclosed subject matter.

In certain illustrative embodiments, the asset tracker 10 can be configured to limit the amount of communication with the cellular network to minimize power usage and optimize battery life, (thus making the device last longer) as well as limit the amount of data usage and associated costs. A diagram of this process 130 is shown in FIG. 7.

Figure 8:
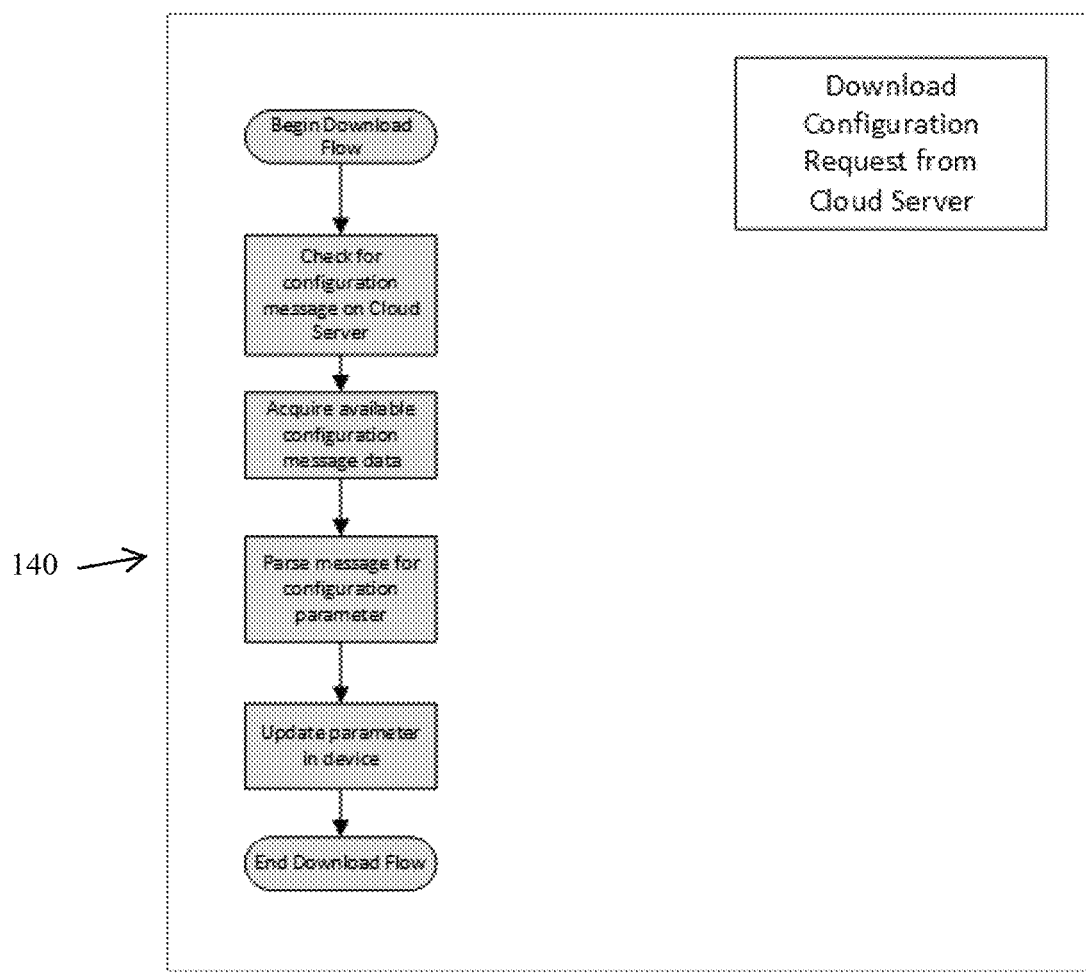
FIG. 8 is a process flow for a download configuration request from a cloud server for an asset tracker in accordance with an illustrative embodiment of the presently disclosed subject matter.

In certain illustrative embodiments, two-way messaging can be established, and such configuration of communications may be adjusted using a series of configuration codes that identify configuration states that may include variable parameters such as wake frequency, frequency of location measurement, communication frequency, etc. A diagram of this process 140 is shown in FIG. 8.

Figure 9:
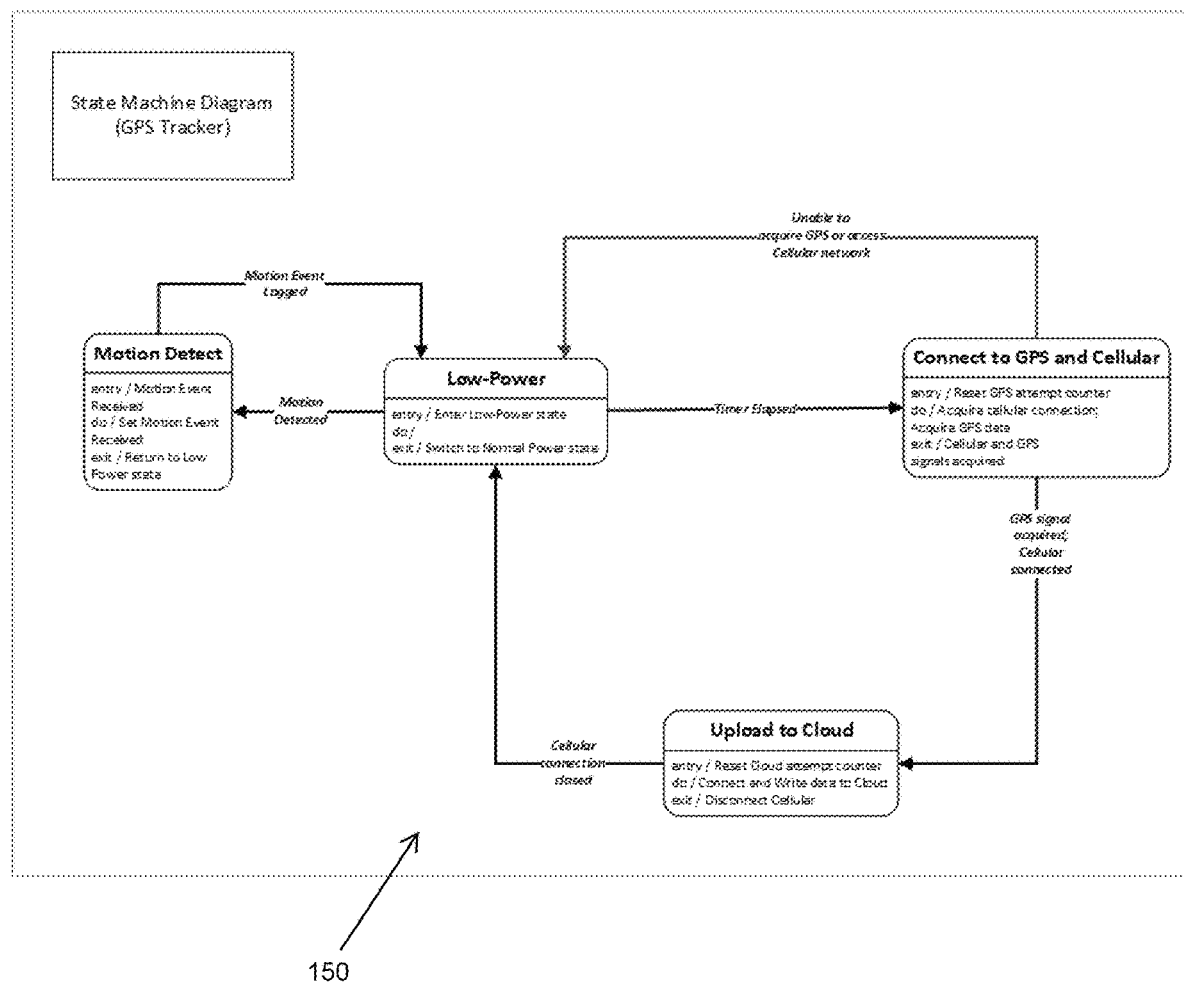
FIG. 9 is a process flow for a state machine diagram (GPS Tracker) for an asset tracker in accordance with an illustrative embodiment of the presently disclosed subject matter.

A system state diagram 150 for an illustrative embodiment of the asset tracker 10 is shown in FIG. 9. The diagram 150 indicates the various events in the process which causes a "trigger" in order to move on to the next state.

Figure 10:
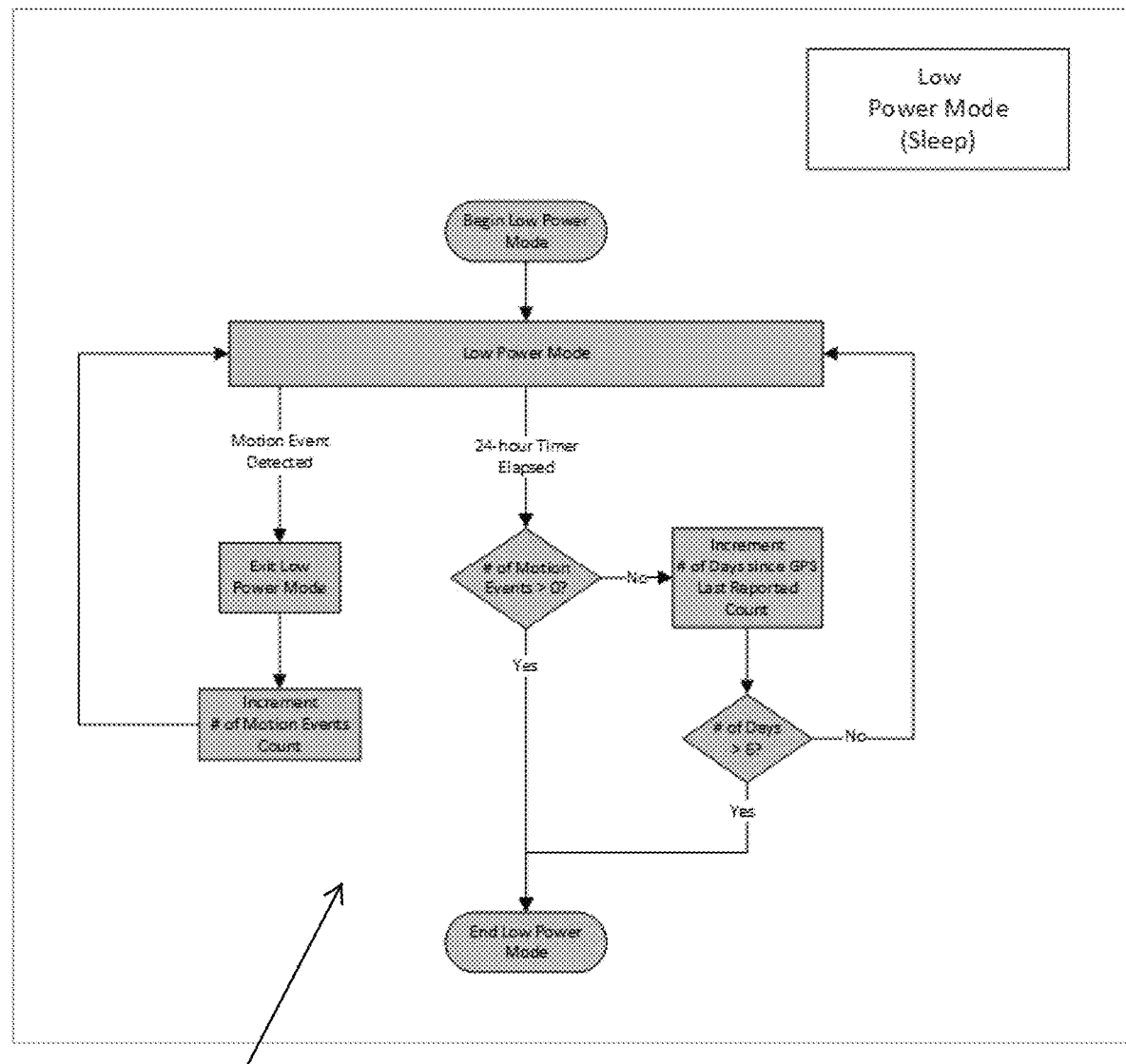
FIG. 10 is a process flow for activating low power mode (sleep) for an asset tracker in accordance with an illustrative embodiment of the presently disclosed subject matter.

In certain illustrative embodiments, the asset tracker 10 will be capable of starting up and acquiring a signal at regular intervals, such as daily by default, but can be configured to only transmit new coordinates (via cellular network) when those coordinates have significantly changed. Otherwise, it will either submit no signal or submit a different message indicating no movement. This will significantly reduce the amount of data transmitted and extend battery life. A diagram for this process 160 is shown in FIG. 10.

Figure 11:
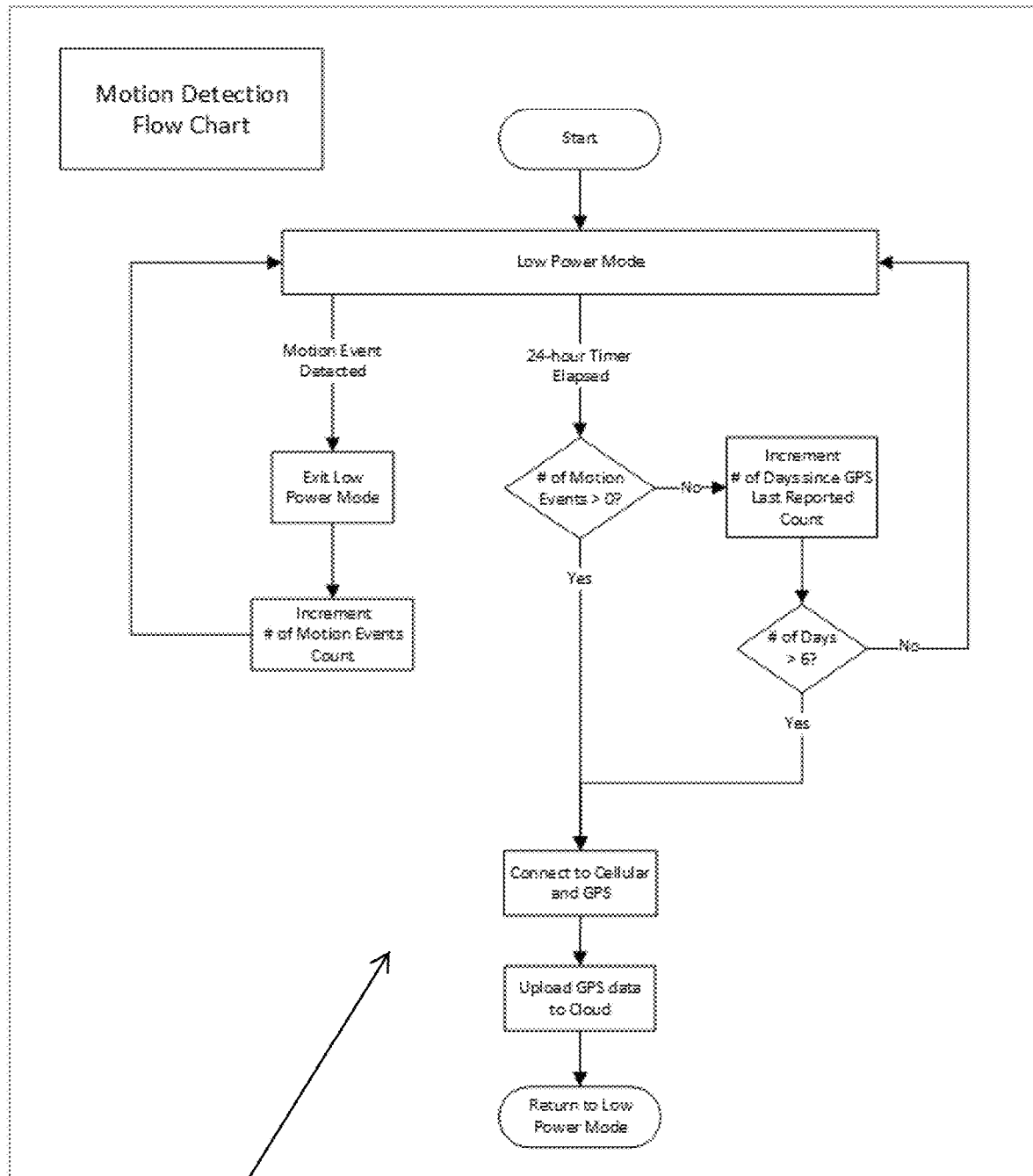
FIG. 11 is a process flow for motion detection for an asset tracker in accordance with an illustrative embodiment of the presently disclosed subject matter.

In certain illustrative embodiments, the asset tracker 10 can utilize logic to detect movement, acquire a GPS signal, and report location. A motion detection flow diagram 170 for an illustrative embodiment of the asset tracker 10 is shown in FIG. 11. The motion detection flow diagram 170 focuses on accelerometer functionality as well as the 24-hour timer used in conjunction with detecting motion events from the accelerometer. By using the ability to detect motion events, which will occur when the asset tracker 10 and attached waste container are moved, the asset tracker's use of battery power should be more efficient. The asset tracker 10 can also keep track of the last time the GPS location was reported to the cloud, by using a 24-hour timer and counting the number of times a motion event was detected during that period.

In certain illustrative embodiments, the motion detection steps can include: (i) accelerometer will check movement; (ii) if movement detected, will exit low power mode and record a motion event; (iii) upon elapse of 24-hours or other programmed interval, the asset tracker 10 can utilize logic to count the number of motion events during recorded interval; (iv) if motion events are recorded, asset tracker 10 can acquire new GPS coordinates, and report its new location back to the cloud via a LTE-M network; (v) if motion events are not recorded, asset tracker 10 can utilize logic to count the number of 24-hour or other programmed intervals since last report of motion events; and (vi) if number of 24-hour or other programmed intervals is above a programmed threshold, such as 6 days by default, asset tracker 10 can acquire GPS coordinates and report its location back to the cloud via a LTE-M network.

Additionally, in certain illustrative embodiments, the asset tracker 10 can use a cellular network to acquire GPS ephemeris data and augmented GPS/A-GPS data to accelerate speed of location acquisition via GPS satellite.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

What is claimed is:

1. An asset tracking device for tracking the location of a waste container, comprising:
    a housing configured to directly attach to the waste container and create a weatherproof seal therewith;
    a plate configured to attach to a side of the housing and enclose contents within the housing, wherein the housing and the plate are sealed together with an O-ring, and wherein the housing has a plurality of corners and the plate is configured to slide into established holes in each corner of the housing;
    a primary control board comprising a processor;
    an accelerometer configured to detect whether a motion event for the asset tracking device has occurred;
    a battery pack;
    a timer configured to measure one or more time intervals; and
    a tracking system consisting of:
        a GPS receiver,
        a GPS antenna,
        a cellular transceiver, and a cellular antenna traced directly onto the primary control board;

wherein the processor is configured to:
determine, in communication with the accelerometer and the timer, whether the motion event occurred during the one or more time intervals; and direct the GPS receiver to acquire updated GPS location coordinates for the asset tracking device due to the occurrence of the motion event.

2. The asset tracking device of claim 1, wherein the primary control board, the accelerometer, the battery pack and the tracking system are housed within the housing.

3. The asset tracking device of claim 1, wherein the processor is further configured to acquire location tracking information via a cellular network.

4. The asset tracking device of claim 1, wherein the processor is further configured to communicate the location of the asset tracking device.

* * * * *